(12) United States Patent
Roy Biswas et al.

(10) Patent No.: US 12,363,245 B2
(45) Date of Patent: Jul. 15, 2025

(54) USER PRINT MODE FOR USER LEVEL OF TREATMENT FLUID

(71) Applicant: Hewlett-Packard Development Company, L.P., Spring, TX (US)

(72) Inventors: Pooshpanjan Roy Biswas, Sant Cugat del Valles (ES); Juan Saez Gomez, Sant Cugat del Valles (ES)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 26 days.

(21) Appl. No.: 18/262,064

(22) PCT Filed: Jan. 19, 2021

(86) PCT No.: PCT/US2021/013935
§ 371 (c)(1),
(2) Date: Jul. 19, 2023

(87) PCT Pub. No.: WO2022/159076
PCT Pub. Date: Jul. 28, 2022

(65) Prior Publication Data
US 2024/0098210 A1 Mar. 21, 2024

(51) Int. Cl.
*H04N 1/60* (2006.01)
*B41J 2/21* (2006.01)

(52) U.S. Cl.
CPC .......... *H04N 1/6033* (2013.01); *B41J 2/2114* (2013.01); *H04N 1/6008* (2013.01)

(58) Field of Classification Search
None
See application file for complete search history.

(56) References Cited

U.S. PATENT DOCUMENTS

| | | | |
|---|---|---|---|
| 8,899,712 B2* | 12/2014 | Vall | B41J 29/393 |
| | | | 347/14 |
| 9,420,146 B2 | 8/2016 | Kuehn | |
| 10,214,038 B2* | 2/2019 | Klinger | H04N 1/4015 |
| 10,414,188 B2* | 9/2019 | Levin | B41J 11/0015 |
| 11,407,221 B2* | 8/2022 | Gracia Verdugo | B41J 2/0458 |
| 11,755,862 B2* | 9/2023 | Blanch Pinol | B41J 2/2132 |
| | | | 347/6 |
| 11,999,172 B2* | 6/2024 | Benito Echevarria | |
| | | | B41J 11/009 |

(Continued)

FOREIGN PATENT DOCUMENTS

| | | | |
|---|---|---|---|
| CN | 104442058 B | 12/2017 | |
| CN | 109080262 A * | 12/2018 | B41J 2/01 |

(Continued)

*Primary Examiner* — Ted W Barnes
(74) *Attorney, Agent, or Firm* — Jordan IP Law, LLC

(57) ABSTRACT

Examples relate to a method to generate a user print mode. The method comprises selecting a predetermined print mode, setting a user level of treatment fluid different to a predetermined level of treatment fluid of the predetermined print mode, obtaining a plurality of color profiles for a plurality of levels of treatment fluid, generating a user color profile based on the obtained plurality of color profiles and replacing the color profile of the selected predetermined print mode by the generated user color profile to generate the user print mode for the set user level of treatment fluid.

15 Claims, 5 Drawing Sheets

(56) References Cited

U.S. PATENT DOCUMENTS

| | | | |
|---|---|---|---|
| 2002/0181018 A1* | 12/2002 | Hung | H04N 1/6033 358/1.9 |
| 2006/0285890 A1* | 12/2006 | Ng | G03G 15/2064 399/329 |
| 2010/0079524 A1* | 4/2010 | Saita | B41J 2/2114 347/14 |
| 2010/0149567 A1* | 6/2010 | Kanazawa | H04N 1/40006 358/1.9 |
| 2010/0201736 A1* | 8/2010 | Ooishi | C09D 11/38 347/21 |
| 2011/0205290 A1* | 8/2011 | Tojo | B41J 2/2114 347/21 |
| 2012/0154837 A1 | 6/2012 | Yamazaki | |
| 2012/0250040 A1 | 10/2012 | Yamazaki | |
| 2012/0320116 A1* | 12/2012 | Humet | B41J 2/2114 347/8 |
| 2013/0050322 A1* | 2/2013 | Vall | B41J 2/175 347/14 |
| 2013/0215440 A1 | 8/2013 | Chandermohan | |
| 2014/0071465 A1* | 3/2014 | Fernandez Del Rio | H04N 1/54 358/1.9 |
| 2014/0160214 A1* | 6/2014 | Conesa | B41J 2/2114 347/101 |
| 2014/0210887 A1* | 7/2014 | Fernandez del Rio | B41J 2/2114 347/14 |
| 2014/0225952 A1* | 8/2014 | Conesa | B41J 2/2132 347/14 |
| 2014/0232783 A1* | 8/2014 | del Rio | B41M 7/0018 347/21 |
| 2014/0292843 A1* | 10/2014 | Fernandez del Rio | B41J 2/2114 347/21 |
| 2015/0029259 A1* | 1/2015 | Humet | B41J 19/142 347/21 |
| 2015/0217587 A1* | 8/2015 | Pous | H04N 1/605 347/6 |
| 2015/0321487 A1* | 11/2015 | Martinez de Salinas Vazquez | B41J 2/2114 347/102 |
| 2016/0052318 A1* | 2/2016 | Humet Pous | B41J 2/01 347/19 |
| 2016/0107435 A1* | 4/2016 | Gracia Verdugo | B41J 2/04563 347/14 |
| 2016/0107438 A1* | 4/2016 | Gracia Verdugo | B41J 2/16579 347/9 |
| 2016/0129715 A1* | 5/2016 | Muller | B41J 29/393 347/19 |
| 2017/0001452 A1* | 1/2017 | Muller | B41J 29/393 |
| 2017/0048420 A1 | 2/2017 | Morovic et al. | |
| 2017/0157941 A1 | 6/2017 | Nichols et al. | |
| 2017/0239957 A1* | 8/2017 | Ochs | H04N 1/6033 |
| 2018/0086099 A1* | 3/2018 | Yamanobe | B65H 43/08 |
| 2019/0132488 A1 | 5/2019 | Yamashita et al. | |
| 2021/0110221 A1* | 4/2021 | Blanch Pinol | B41J 2/2114 |
| 2022/0368812 A1* | 11/2022 | Morovic | H04N 1/6097 |
| 2023/0023168 A1* | 1/2023 | Echevarria Benito | H04N 1/58 |

FOREIGN PATENT DOCUMENTS

| | | | |
|---|---|---|---|
| WO | WO-2019199267 A1 * | 10/2019 | ............ B41J 2/2054 |
| WO | 2020/202618 A1 | 10/2020 | |

* cited by examiner

| N | C | M | Y | B | Lc | Lm | TF |
|---|---|---|---|---|---|---|---|
| 1 | a11 | b11 | c11 | d11 | e11 | f11 | TF1 |
| 2 | a12 | b12 | c12 | d12 | e12 | f12 | TF1 |
| . | . | . | . | . | . | . | . |
| . | . | . | . | . | . | . | . |
| . | . | . | . | . | . | . | . |
| n | a1n | b1n | c1n | d1n | e1n | f1n | TF1 |

| N | C | M | Y | B | Lc | Lm | TF |
|---|---|---|---|---|---|---|---|
| 1 | a21 | b21 | c21 | d21 | e21 | f21 | TF2 |
| 2 | a22 | b22 | c22 | d22 | e22 | f22 | TF2 |
| . | . | . | . | . | . | . | . |
| . | . | . | . | . | . | . | . |
| . | . | . | . | . | . | . | . |
| n | a2n | b2n | c2n | d2n | e2n | f2n | TF2 |

| N | C | M | Y | B | Lc | Lm | TF |
|---|---|---|---|---|---|---|---|
| 1 | a31 | b31 | c31 | d31 | e31 | f31 | TF3 |
| 2 | a32 | b32 | c32 | d32 | e32 | f32 | TF3 |
| . | . | . | . | . | . | . | . |
| . | . | . | . | . | . | . | . |
| . | . | . | . | . | . | . | . |
| n | a3n | b3n | c3n | d3n | e3n | f3n | TF3 |

USER PRINT MODE FOR USER LEVEL OF TREATMENT FLUID

BACKGROUND

A printing system may include a pen or a printhead with a plurality of nozzles that deliver print agent onto a print medium so as to print an image. Some printing systems may deliver a treatment fluid onto a print medium to enhance the adherence of the print agent.

BRIEF DESCRIPTION OF THE DRAWINGS

Various example features will be apparent from the detailed description which follows, taken in conjunction with the accompanying drawings, wherein.

DETAILED DESCRIPTION

Figure 1:
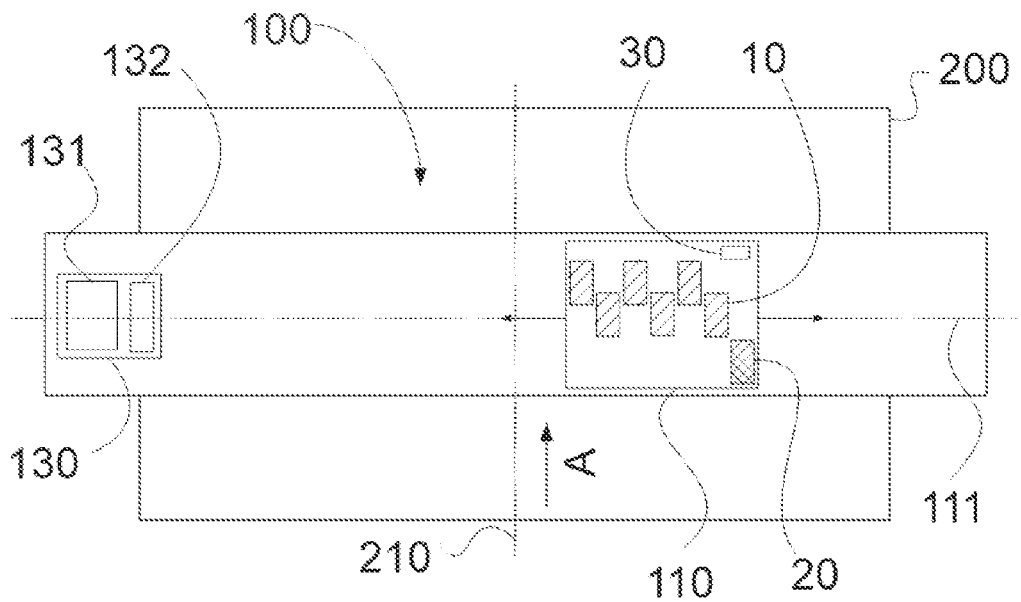
FIG. 1 schematically illustrates a printing system according to an example of the present disclosure.

A printing system comprises a printhead which may deliver print agent onto a print medium, e.g. a paper sheet. The printhead may be provided with a plurality of nozzles to deliver print agent, e.g. ink, onto the print medium so as to print an image. In this disclosure, delivering includes firing, ejecting, spitting or otherwise depositing print agent or ink. The printhead may be mounted on a printhead support.

In some examples, the printhead support may comprise a carriage. The printhead may thus be mounted on a carriage for moving across a scan axis. The printhead may travel repeatedly across a scan axis for delivering print agent onto a print medium which may advance along an advancing axis. The scan axis may be substantially perpendicular to the advancing axis. In some examples, several printheads may be mounted on a carriage. In some examples, four printheads may be mounted on a single carriage. In some examples, eight printheads may be mounted on a single carriage.

In some examples, the printhead support may be static. The printhead may extend along a width of a print medium. The plurality of nozzles may be distributed within the printhead along the width of the print medium. The width of the print may be substantially perpendicular to an advancing axis of the print medium. Such an arrangement may allow most of the width of the print medium to be printed simultaneously. These printing systems may be called as page-wide array (PWA) printing systems.

In some examples, a printhead may comprise a plurality of print agent ejection assemblies. A print agent ejection assembly may eject or deliver print agent from a nozzle by activating an actuator associated with the nozzle, e.g. in fluid communication with the nozzle.

In some examples, the actuator may be a heating element, e.g. a thermal resistor element. An electrical current may pass through the heating element to generate heat. This heat may cause a rapid vaporization of print agent in a print agent chamber or firing chamber, increasing an internal pressure inside this print agent chamber. This increase in pressure makes a drop of print agent exit from the print agent chamber to the print medium through a nozzle. These printing systems may be called as thermal inkjet printing systems.

In some examples, the actuator may be a piezo electric. A piezo electric may be used to force a drop of print agent to be delivered from a print agent chamber or reservoir onto the print medium through a nozzle. A voltage may be applied to the piezo electric, which may change its shape. This change of shape may force a drop of print agent to exit through the nozzle. These printing systems may be called as piezo electric printing systems.

In some examples, the printing system may deliver a treatment fluid onto the print medium to enhance the adherence of the print agent. In some examples, a dedicated printhead may be used for delivering a treatment fluid onto the print medium. This dedicated printhead may be called as a treatment fluid printhead. Treatment fluid printhead may be mounted on the carriage.

The treatment fluid may be delivered onto a print medium before, simultaneously with, or after print agent has been delivered. The treatment fluid may help to adhere or to fix the print agent, e.g. colorants of the print agent, to the print medium to reduce bleed. In this disclosure, treatment fluid includes fixing fluid, optimizer fluid, pre-treat fluid, post-treat fluid or overcoat fluid. Treatment fluids are colorless but can influence the color of an image printed on a print medium. Some treatment fluids may be seen on some print media when deposited in conjunction print agents. Treatment fluids may by applied in conjunction with some print agents, e.g. latex inks.

Treatment fluids attract print agent and fixes it to a point of the print medium. Print agent delivered is thus prevented from moving which enhances the evaporation process. Treatment fluid may prevent the print agent from migrating, bleeding and coalescing. Treatment fluids may thus increase the printing speed and color consistency. In addition, amount of print agent absorbed by the print medium may be increased.

Amount or volume of treatment fluids delivered may be expressed as a percentage of the print agent delivered. For example, a level of a treatment fluid of 10% indicates that the volume of treatment fluid is the 10% of total volume of the print agent.

Levels of treatment fluid may vary in function of the print medium. For example, the level of treatment fluid may be 10%-20% for some smooth surfaces, 20%-30% for fabric and 30%-50% for some canvas.

In some examples, a plurality of print agent printheads, i.e. printheads delivering print agent, delivers different print agent colors onto a print medium. Print agent colors are print agent comprising a colorant, e.g. ink comprising a colorant. An image may be formed in a print medium by delivering a plurality combinations of different print agent colors. A specific color may be reproduced on a print medium by a specific combination of print agent colors. In this disclosure, print agent colors refer to the process colors delivered by the print agent printhead to create a plurality of colors onto a print medium.

Examples of print agent colors contained in the plurality of print agent printheads may be cyan, magenta, yellow and black. These print agent colors may be called as CMYK colors. Each combination of cyan, magenta, yellow and black may create a different color onto a print medium.

Examples of print agent colors may be cyan, magenta, yellow, black, light magenta and light cyan. These print agent colors may be called as CcMmYK or CMYKcLm colors.

Examples of print agent colors may be red, orange, violet, blue and grey.

The plurality of print agent printheads may form a color on the print medium by overlapping a layer of these print agent colors. A color on the print medium may thus be formed by a combination of a specific amount of each of the print agent colors. For example, for CMYK colors, a printed color may be formed a % of cyan print agent, b % of magenta print agent, c % of yellow print agent and d % of black print agent, wherein a, b, c and d is respectively the percentage amount of each of the different print agent colors. Amount of a print agent color may be defined as the volume or mass percentage of this print agent color over the total volume print agent colors to create a dot of a specific color.

A color profile is a set of data that characterizes a color input or output device, or a color space. A color profile characterizes how colors are reproduced by a printer on a print medium in a particular print mode. An ICC profile may be an example of a color profile. An ICC profile is a color profile that characterizes how colors are reproduced according to standards promulgated by the International Color Consortium (ICC).

Color profiles describe the color attributes of a particular device or viewing requirement by defining a mapping between the device source or target color space and a profile connection space (PCS). This PCS may be a CIELAB (LAB) color space or a CIEXYZ (XYZ) color space. Mappings may be specified using tables, to which interpolation may be applied, or through a series of parameters for transformations. A LAB color space is a color-opponent space with dimension L for lightness and A and B for the color-opponent dimensions, based on nonlinearly compressed CIEXYZ color space coordinates.

A color profile may include a forward color lookup table defining a forward transform value, called as an "AToB tag," for converting between print agent colors used by the print agent printheads and colorimetry values, such as CIELAB (LAB) values or CIEXYZ (XYZ) values. In some examples, a color profile may also include a reverse color lookup table defining a reverse transform value, called as a "BToA tag" for converting between colorimetry values, such as the LAB values or XYZ values and amounts of print agent colors, e.g. CMYK values, for the plurality of print agent printheads.

A color profile includes an amount of print agent color to reproduce a plurality a plurality of colors on a print medium. Color profiles may depend on the type of print medium. Different color profiles may thus be defined for different print media. Each color profile may define the color printing characteristics of a given print medium.

A print mode may define a color profile for a type of print medium. In some examples, a print mode may define a color profile for a type of print medium and for a level of treatment fluid.

Some printing systems may incorporate a plurality of print modes for printing onto different print media with a particular level of treatment fluids. Each print mode of the plurality of print modes may comprise a type of print medium, a default color profile and a default level of treatment fluid. In some examples, a user may want to modify the default level of treatment fluid for the print medium, for example, to increase printing speed.

FIG. 1 schematically illustrates an example of a printing system 100 according to one example of the present disclosure. The printing system 100 of this figure comprises print agent printheads 10 to deliver different print agent colors onto a print medium 200, a treatment fluid 20 to deliver treatment fluid and a controller 130 to receive a selection of a predetermined print mode having a predetermined color profile for a predetermined level of treatment fluid, receive a user selection of replacing the predetermined level of treatment fluid by a user level of treatment fluid, generate a user color profile for the user level of treatment fluid by estimating an amount of different print agent colors to generate a plurality of colors from a plurality of color profiles for several levels of treatment fluid, generate a user print mode based on the generated user color profile for the user level of treatment fluid and set the user print mode.

A user color profile taking into account the user level of treatment fluid may thus be used. Amount of print agent colors to create a plurality of colors on the print medium may thus be adjusted for the user level of treatment fluid. Color accuracy may thus be increased for a level of treatment fluid different to the predetermined level of treatment fluid. Consequently, color response may be enhanced for different levels of treatment fluid. In addition, the overall amount of print agent used may be reduced.

The printing system 100 of this figure comprises plurality of print agent printheads 10 having a plurality of nozzles (not shown in FIG. 1) to deliver print agent. Print agent may be delivered onto a print medium 200. The printing system 100 of FIG. 1 comprises a treatment fluid printhead 20 to deliver treatment fluid onto a print medium. In this figure, print agent printheads are cross hatched and the treatment fluid printhead is double cross hatched for illustrative purposes. In some examples, print agent printheads and the treatment fluid printhead may be structurally similar.

The print medium 200 may advance or move along the advancing axis 210 following the direction represented by arrow A. The print medium may be moved by an advancer (not shown in FIG. 1). An advancer may include a roller and/or a wheel. The print medium 200 may be of any shape or size to be used in the printing system.

The print medium is a material capable of receiving a print agent, e.g. latex ink. In some examples, the print medium may be a sheet of paper. In some examples, the print medium may be a sheet of cardboard, textile material, plastic material or canvas. Examples of plastic material may include PVC, self-adhesive vinyl or PET films.

The print agent printheads 10 and the treatment fluid printhead 20 of this figure are mounted on a printhead support 110. The printhead support 110 of FIG. 1 is a carriage. The carriage 110 supporting a plurality of printheads (print agent printheads and a treatment fluid printhead) may travel across a scan axis 111 for delivering print agent onto a width of the print medium 200. In this disclosure, a width of a print medium extends substantially perpendicular to the advancing axis 210 and a length of a print medium extends substantially parallel to the advancing axis 210. In this example, the printhead support 110 receives six print agent printheads 10 and a treatment fluid printhead 20. In some examples, two print agent printheads may be mounted on a carriage. In some examples, four print agent printheads may be mounted on a carriage. A plurality of print agent printheads may thus be mounted on a carriage. In some examples, a plurality of treatment fluid printheads may be mounted on a carriage. In this sense, different types of treatment fluids may be delivered.

In some examples, the printhead support may statically span substantially the whole width of the print medium. In these examples, the printhead support may be a print bar supporting a plurality of printheads (including a print agent printhead and a treatment fluid printhead). The printheads may be used in a page-wide array (PWA) printing system.

In the example of FIG. 1, the plurality of print agent printheads 10 mounted on the printhead support 110 are misaligned relative to the scan axis 111. A print agent printhead of the plurality of print agent printheads may be downstream to another print agent printhead of the plurality of print agent printheads. An upstream print agent printhead may deliver print agent on a print medium and a downstream printhead may deliver print agent over a previously deposited print agent. An image on a print medium may thus comprise several layers of print agent delivered by different print agent printheads.

In some examples, the plurality of print agent printheads may be mounted aligned relative to the scan axis.

In the example of FIG. 1, the treatment fluid printhead is upstream to the plurality of print agent printheads. Treatment fluid may thus be deposited onto the print medium before depositing print agent. In some examples, a treatment fluid printhead and a print agent printhead may be aligned relative to the scan axis. In some examples, a treatment fluid printhead may be downstream to the plurality of print agent printheads.

The plurality of print agent printheads of the printing system of FIG. 1 may deliver a plurality of print agent colors. The printing system of this figure comprises six print agent printheads that may deliver six different print agent colors: cyan, magenta, yellow, black, light magenta and light cyan. In some examples, each print agent printhead may deliver one print agent color. In some examples, a print agent printhead may deliver two different print agent colors. A first plurality of nozzles of a print agent printhead may deliver a first print agent color and a second plurality of nozzles of the print agent printhead may deliver a second print agent color. For example, two print agent printheads may deliver black and cyan, other two print agent printheads may deliver magenta and yellow and the remaining two print agent printheads may deliver light magenta and light cyan.

In some examples, the printing system comprises six print agent printheads that may deliver four different print agent colors, e.g. cyan, magenta, yellow and black. In some examples, the printing system comprises eight print agent printheads that may deliver a plurality of print agent colors, e.g. four or six different print agent colors.

Nozzles of the plurality of nozzles may be placed in subgroups. The subgroups may comprise nozzles grouped in rows, i.e. parallel to the scan axis 111, and in columns, i.e. parallel to advancing axis 210. Longer rows may lead to swaths having a greater height (in the advancing axis 210) if all nozzles were to deliver print agent. In this disclosure, a swath refers to an area of a print medium that can be printed by a printhead in a single pass, i.e. from one lateral side of the print medium to the opposite side along the scan axis 111. In some examples, a subgroup of nozzles may deliver a print agent color. In some examples, a print agent printhead comprises a first subgroup of nozzles to deliver a first print agent color and a second subgroup of nozzles to deliver a second print agent color. In some examples, the printhead may deliver print agent on both on the way and the way back. In some examples, the printing system may comprise an inkjet printer.

The printing system 100 of FIG. 1 comprises a controller 130. The controller 130 may receive a selection of a predetermined print mode having a predetermined color profile for a predetermined level of treatment fluid, receive a user selection of replacing the predetermined level of treatment fluid by a user level of treatment fluid, generate a user color profile for the user level of treatment fluid by estimating an amount of different print agent colors to generate a plurality of colors from a plurality of color profiles for several levels of treatment fluid, generate a user print mode based on the generated user color profile for the user level of treatment fluid and set the user print mode.

In FIG. 1, the controller 130 includes a processor 131 and a non-transitory machine-readable storage medium 132. The non-transitory machine-readable storage medium 132 is coupled to the processor 131.

The processor 131 performs operations on data. In an example, the processor is an application specific processor, for example a processor dedicated to control a generation of a user print mode. The processor 131 may also be a central processing unit for controlling the operation of the printing system.

The non-transitory machine-readable storage medium 132 may include any electronic, magnetic, optical, or other physical storage device that stores executable instructions. The non-transitory machine-readable storage medium 132 may be, for example, Random Access Memory (RAM), an Electrically-Erasable Programmable Read-Only Memory (EEPROM), a storage drive, an optical disk, and the like.

In some examples, the printing system comprises a user interface device in communication with the controller. A user may interact with the user interface device for selecting a predetermined print mode, a predetermined print medium or for replacing a predetermined level of treatment fluid for a user level.

In some examples, the controller may receive a selection of the predetermined print mode from a user selection. A user may thus select one predetermined print mode from the user interface device. A plurality of print modes may be selected from the user interface device. Print modes may be associated with types of print media. Each predetermined types of print media may be associated with a predetermined print mode.

In some examples, a user may select one predetermined print medium from the user interface device. A predetermined print mode may be associated with this selected print medium. The predetermined print mode for the selected print medium may be stored in a storage medium, e.g. in the non-transitory machine-readable storage medium of FIG. 1. The controller may thus receive the predetermined print mode from a storage medium upon the selection of predetermined type of print medium.

In some examples, the printing system comprises a sensor to detect the type of print medium. A sensor may detect a predetermined print medium and the controller may receive this detection from the sensor. The controller may associate the predetermined print medium with a predetermined print mode.

The storage medium 132 of FIG. 1 storages a plurality of predetermined print modes. The predetermined print modes comprise a predetermined color profile for a predetermined level of treatment fluid.

The controller 130 of FIG. 1 may receive user selection for replacing the predetermined level of treatment fluid by a user level of treatment fluid. The user may want to increase or decrease the amount of treatment fluid. For example, the user may increase the amount of treatment fluid, e.g. optimizer, if coalescence is detected. If bleed is detected, the user may want to decrease the amount of treatment fluid. The user may interact with the user interface device to set a user level of treatment fluid different to the predetermined level of treatment fluid of the predetermined print mode.

Upon the selection of a user level of treatment fluid, the controller generates a user color profile for the user level of treatment fluid. Amount of different print agent colors, e.g. amount of each CMYKLcLm colors, may be adjusted to the user level of treatment fluid. Color accuracy may thus be increased. The user color profile may be generated by estimating an amount of different print agent colors to generate a plurality of colors from a plurality of color profiles for several levels of treatment fluid. Color profiles defined for different levels of treatment fluid may thus be used for generating a user profile for a user level of treatment fluid.

In some examples, each color profile for different levels of treatment fluid comprises a plurality of combinations of different print agent colors. Each combination of different print agent colors creates a particular color on a print medium. Each combination of different print agent colors may comprise an amount of these different print agent colors. The amounts of each different print agent color for different levels of treatment fluid may be used for estimating the amounts of these print agent colors for a user treatment fluid.

For example, the user color profile may be generated from two color profiles, each of them having a different level of treatment fluid. A first color profile corresponds to a first level of treatment fluid and a second color profile corresponds to a second level of treatment fluid. For reproducing a first color on a print medium, the first color profile may be defined by an amount a11% of cyan print agent, an amount b11% of magenta print agent, an amount oil % of yellow print agent, an amount dl 1% of black print agent, an amount el 1% of light cyan print agent and amount f11% of light magenta print agent. Similarly, the second color profile respectively comprises amount a21%, b21%, c21%, d21%, e21% and f21% of C, M, Y, K, Lc, Lm for reproducing this first color on the print medium. The amount of cyan of the user color profile for reproducing this first color on the print medium with a user level of treatment fluid may be estimated from the amount a11% and a21%. In some examples, estimating the amount of cyan of the user profile comprises interpolating the amount a11% and a21%. Interpolating may comprise linear interpolation, polynomial interpolation or spline interpolation. The amount of the other print agent colors for reproducing this first color may be similarly estimated from. Analogously, the amount of the print agent colors for a user level of treatment fluid may be estimated for each of the colors to be reproduced on the print medium.

In some examples, a color profile may comprise a linearization table. The linearization table may include a combination of print agent colors for generating each color on a print medium. The first color profile may comprise a first linearization table and the second color profile may comprise a second linearization table. A user linearization table may be generated by interpolating the first linearization table and the second linearization table.

In some examples, the user color profile may be generated from three color profiles, e.g. from three linearization tables. Accuracy in generating the user color profile may thus enhanced.

The controller 130 may generate a user print mode based on the generated user color profile for the user level of treatment fluid. The controller may then set the user print mode. Accordingly, the controller may instruct the print agent printheads to deliver a combination of print agent colors according to the user control profile to reproduce a color on a print medium. The controller may also instruct the treatment fluid printhead to deliver a user level of treatment fluid for each combination of print agent colors.

The controller may be to receive instructions to print an image on a print medium, e.g. from user interface device, and to instruct the print agent printheads deliver an amount of each of the different print agent colors for each of the colors of the plurality of colors to be generated on the print medium according to the user print mode.

In some examples, the controller may obtain the plurality of color profiles for several levels of treatment fluid.

In some examples, the controller may instruct the printing system to generate the plurality of color profiles for different levels of treatment fluid. The generation of this plurality of color profiles may be according to any of the examples herein disclosed. For example, generating a plurality of color profiles, each of them having a different level of treatment fluid, may comprise printing a plurality of test charts having different levels of treatment fluid, scanning this plurality of test charts and creating the plurality of color profiles having different levels of treatment fluid based on the corresponding scanned plurality of test charts.

The printing system of FIG. 1 comprises a color measuring device 30 for scanning the plurality of test charts. The color measuring device 30 may be spectrophotometer, e.g. an embedded spectrophotometer. In FIG. 1, the color measuring device is mounted on the carriage 110. In some examples, the color measuring device may be apart from the printing system. The controller 130 of FIG. 1 may thus instruct the color measuring device to scan or analyze the test charts. The controller may also be to receive data from the color measuring device.

A color sensor device, e.g. spectrophotometer, may measure a reflection or transmission property of a material as a function of wavelength to measure color. In some examples, the color sensor device may convert the measured data from the spectral space to a CIELAB (LAB) or a CIEXYZ (XYZ) space.

In some examples, the controller may receive the plurality of color profiles from a storage medium, e.g. the storage medium 132 of FIG. 1. Previously generated color profiles may be stored in the storage medium and used for generating a user color profile upon the selection of user level of treatment fluid.

Figure 2:
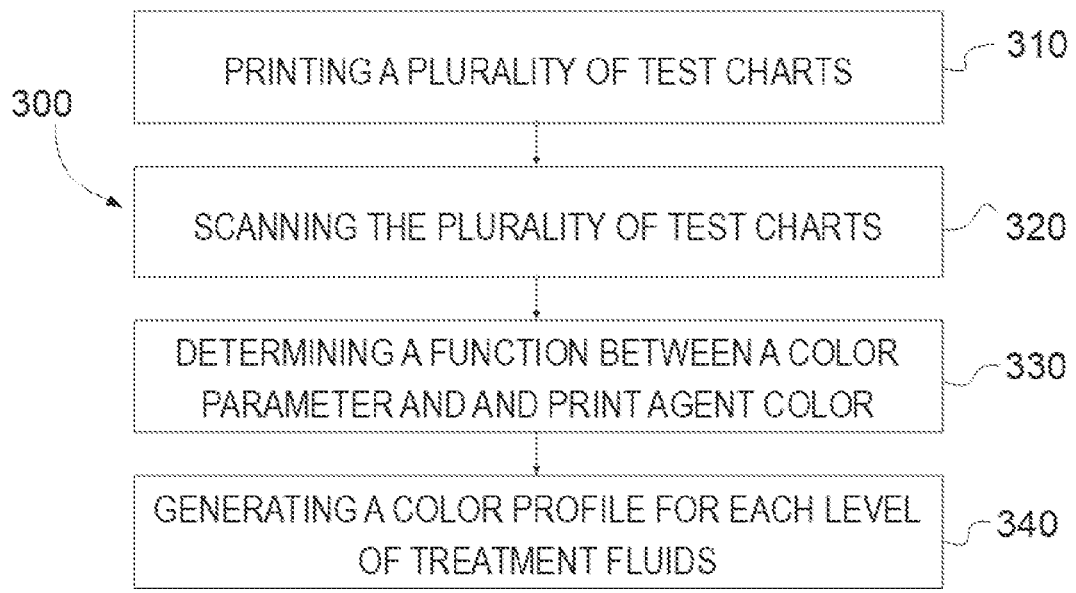
FIG. 2 is a block diagram of a method according to an example of the present disclosure.

FIG. 2 is a block diagram of a method according to an example of the present disclosure. The method 300 comprises printing 310 a plurality of test charts using a plurality of print agent colors, wherein each test chart comprises a different level of treatment fluid, scanning 320 the plurality of test charts; determining 330 for each test chart of the plurality of test charts a function between a color parameter and an amount of each print agent color of the plurality of print agent colors and generating 340, based on each determined function, a color profile for each level of treatment fluid so that a plurality of color profiles for different levels of treatment fluid is generated.

Color profiles for different levels of treatment fluids may be created for a particular print medium in a relatively short time. These generated color profiles may be generated for the specific conditions of the particular print medium and of the batch of print agent colors and treatment fluid. Printing accuracy may thus be increased. These determined color profiles may be used for generating a user color profile with a user level of treatment fluid. In some examples, the these determined color profiles may be stored and used for generating a user color profile when a user select a different treatment fluid for a particular print medium.

The plurality of test charts may be printed according to any of the examples herein disclosed. In some examples, a of test chart comprise a halftone test charts. The plurality of test charts may be printed by using a halftone technique. Printing a halftone test chart comprises varying a size of dots or spacing between dots to generate a gradient-like effect. In some examples, printing 310 a plurality of test charts using a plurality of print agent colors comprises printing a plurality of halftone test charts using the plurality of print agent colors. Amount of each print agent colors may thus vary along the test chart.

In some examples, a test chart comprises a sub-test chart for each print agent color of the plurality of print agent colors.

The plurality of test charts may be scanned or analyzed by a color measuring device, e.g. a spectrophotometer. Color of the plurality of tests charts may thus analyzed. A color parameter of each of the plurality of tests charts may be obtained from the color measuring device. In some examples, a color parameter comprises lightness. In some examples, the color parameter comprises hue. In some examples, the color parameter comprises chroma.

A function between a color parameter, e.g. lightness, and an amount of each print agent color may be obtained from each test chart according to any of the examples herein disclosed. A color measuring device may obtain a variation of the color parameter along a test chart. As the amount of the print agent color may vary along the test chart, a relation between the color parameter and the amount of print agent color may be determined. This function is used to generate a color profile for each level of treatment fluids. This function provides data about the effect of the level of treatment fluid.

A color profile for each level of treatment fluids may be generated from each of the corresponding determined function relating color parameter and amount of print agent color. For example, a function for a first level of treatment fluid may be applied to an original or predetermined color profile corresponding to the current print medium so as to generate a color profile for the first level of treatment fluid. Amounts of print agent colors defined by this color profile are thus adjusted to the first level of treatment fluid. Color profiles for the remaining levels of treatment fluid may be analogously determined.

In some examples, generating a color profile for each level of treatment fluids may comprise determining an amount of each print agent color of the plurality of print agent colors to generate a plurality of colors on a print medium. In some examples, determining an amount of each print agent color of the plurality of print agent colors comprises generating a linearization table comprising the amount of each print agent color of the plurality of print agent colors to generate the plurality of colors on a print medium.

In some examples, the method 300 comprises storing the generated color profiles in a medium storage, e.g. in the medium storage 132 of FIG. 1. These color profiles for different levels of treatment fluid may be used to generate a user color profile having a user level of treatment fluid.

The method 300 of FIG. 2 may be applied in any of the examples for generating a user print mode herein disclosed.

Figure 3:
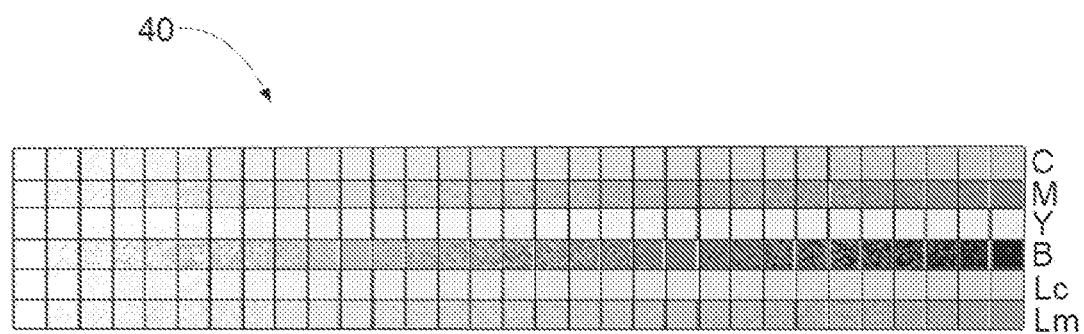
FIG. 3 schematically illustrates a test chart according to an example of the present disclosure.

FIG. 3 schematically illustrates a test chart according to an example of the present disclosure. The test chart 40 of FIG. 3 is an example of a test chart printed for a level of treatment fluid. The test chart 40 comprises a plurality of rows and a plurality of columns. Each row represents a print agent color. In this example, the plurality of rows comprise a row printed from C (cyan), a row printed from M (magenta), a row printed from Y (yellow), a row printed from B (black), a row printed from Lc (light cyan) and a row printed from Lm (light magenta). In some examples, four rows using CMYB may be printed.

Each column of this chart represents a different dot density. The test chart 40 of this figure comprises 31 columns. In some examples, the test chart may comprise a suitable number of columns. The density of dots for each print agent color increases from the left to the right. The test chart of this figure is a halftone test chart. In some examples, spacing between dots may decrease from the left to the right. In some examples, size of dots may increase from the left to the right. In this figure, the amount of each print agent color gradually increases from the left to the right. In some examples, a color parameter may decrease from the left to the right. For example, a lightness may decrease when the amount of print agent color increases.

A test chart printed with a level of treatment fluid may be scanned or measured by a color measuring device, e.g. embedded spectrophotometer, for generating a color profile for this level of treatment fluid. A plurality of test charts, each of them for a different level of treatment fluid, may be printed for generating a corresponding color profile for these different levels of treatment fluid.

In some examples, the color measuring device may convert spectral signals obtained by the color measuring device to a CIELAB (LAB) or a CIEXYZ (XYZ) space. A profiler may transform data from CIELAB (LAB) or a CIEXYZ (XYZ) to a color process space, e.g. a CMYK space, to generate a color profile.

In some examples, the color measuring device may output a function between a color parameter and an amount of print agent color for each of the print agent colors. The profiler may transform data provided by this function to a color process space to generate a color profile.

Figures 4, 5A, 5B:
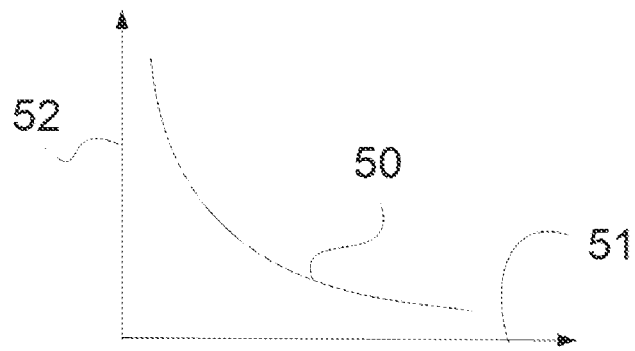
FIG. 4 shows an example of a graph of a function created by a color measuring device according to an example of the present disclosure.
FIGS. 5A, 5B and 5C respectively shows a first, a second and a third linearization tables according to an example of the present disclosure.

FIG. 4 shows an example of a graph of a function 50 created by a color measuring device according to an example of the present disclosure.

This figure shows a variation of a color parameter for amount of a print agent color of a test chart according to any of the examples herein disclosed. The x-axis 51 represents an amount of a print agent color, e.g. print agent drops, and the y-axis 52 represents the color parameter obtained by the color measuring device. The color parameter may comprise lightness. The graph of FIG. 4 shows that the color parameter decreases when the number of print agent drops increases. The graph of FIG. 4 may, for example, shows the relationship between the number of drops of cyan and lightness.

The function 50 provides information about how the level of treatment fluid influences the color response. The level of treatment fluid may affect the color response of a print agent color delivered onto a print medium. For example, the level of treatment fluid, e.g. an optimizer, may influence the lightness of the printed image.

When a color measurement device analyzes a test chart printed for a given level of treatment fluid, the color measurement device may generated a graph of a function between a color parameter and an amount of print agent color for each of the print agent colors. For example, for the test chart of FIG. 3, the color measurement device may generate six graphs, each of them relating the amount of a print agent color (CMYKLcLm) and a color parameter.

Accordingly, from a test chart the color measure device may generate a plurality of functions, each of them relating a color parameter and the corresponding print agent color.

A color profile for a given level of treatment fluid may then be generated from the plurality of functions obtained by scanning a test chart printed with this given level of treatment fluid. An amount of each print agent color for reproducing each color of a plurality of colors on a print medium may be generated for this given level of treatment fluid.

In some examples, the amount of each print agent color for reproducing each color of a plurality of colors on a print medium may comprise generating a linearization table. For each color to be reproduced on a print medium, the linearization table may comprise the amounts of each print agent colors.

In some examples, a linearization table for a given level of treatment fluid may be obtained by adjusting, based on the determined functions relating color parameter and amounts of print agent colors, an original or predetermined linearization table. Before printing a test chart (or a plurality of test charts) the printing system may operate according to a predetermined color profile defined for a predetermined level of treatment fluid. This predetermined color profile may comprise a predetermined linearization table which comprises an amount of each print agent color to be used for reproducing each color of a plurality of colors on a print medium. The level of treatment fluid may be changed to a first level of treatment for printing a test chart, e.g. a test chart according to FIG. 3. A function between a color parameter and an amount of print agent color may be obtained for each print agent color as explained before. This may be used to calculate a factor to be applied on the predetermined linearization to generate a first linearization table for the first level of treatment fluid.

Analogously, a plurality of test charts for different levels of treatment fluid may be printed and a plurality of linearization tables may be generated by analyzing these test charts.

Figures 5C, 6:
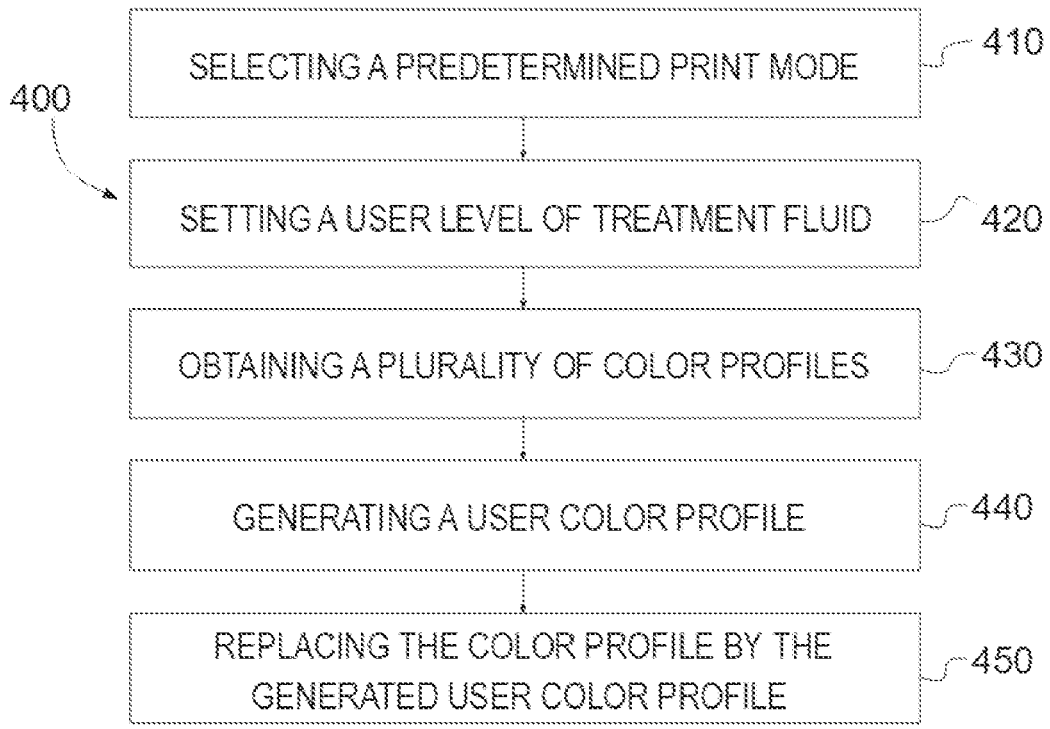
FIG. 6 is a block diagram of a method to generate a user print mode according to an example of the present disclosure.

FIGS. 5A, 5B and 5C respectively shows a first, a second and a third linearization tables according to an example of the present disclosure. The column N of these tables represents the plurality of colors to be reproduced on a print medium. In this example, n colors may be created on a print medium. Columns C, M, Y, B, Lc and Lm represents the amount of each of these print agent colors to create a particular color on a print medium. Column TF represents the amount of treatment fluid.

These linearization tables may be representative of a color profile. The first linearization table (FIG. 5A) may be representative of a first color profile for a first level of treatment fluid (TF1). The second linearization table (FIG. 5B) may be representative of a second color profile for a second level of treatment fluid (TF2). The third linearization table (FIG. 5C) may be representative of a third color for a third level of treatment fluid (TF2).

Each row of these tables shows the amount of each of the print agent colors to create a color of the 1 to n colors in a print medium. Amounts of each print agent colors to create the same color may be different in these tables. For example, for creating the color labelled as "2", the first color profile uses a12% of C, b12% of M, c12% of Y, d12% of B, e12% of Lm and f12% of Lc, the second color profile uses a22% of C, b22% of M, c22% of Y, d22% of B, e22% of Lm and f22% of Lc and the third color profile uses a32% of C, b32% of M, c32% of Y, d32% of B, e32% of Lm and f32% of Lc.

These linearization tables may be obtained from any of the examples herein disclosed. For example, these linearization tables may be received from a storage medium. For example, these linearization tables may be obtained by respectively analyzing a first test chart printed for the first level of fluid treatment, a second test chart printed for the second level of fluid treatment and a third test chart printed for the third level of fluid treatment.

FIG. 6 is a block diagram of a method to generate a user print mode according to an example of the present disclosure. The method 400 to generate a user print mode comprises selecting a predetermined print mode, wherein a print mode comprises a color profile for a print medium and for a level of treatment fluid as represented at block 410, setting a user level of treatment fluid different to a predetermined level of treatment fluid of the predetermined print mode as represented at block 420, obtaining a plurality of color profiles for a plurality of levels of treatment fluid as represented at block 430, generating a user color profile based on the obtained plurality of color profiles as represented at block 440 and replacing the color profile of the selected predetermined print mode by the generated user color profile to generate the user print mode for the set user level of treatment fluid as represented at block 450.

Amount of print agent colors to create a plurality of colors on the print medium may thus be adjusted for the user level of treatment fluid. Color accuracy may thus be increased for a level of treatment fluid different to the predetermined level of treatment fluid. Consequently, color response may be enhanced for different levels of treatment fluid. In addition, the overall amount of print agent used may be reduced.

A print system according to any of the examples herein disclosed may perform the method 400.

In some examples, the method 400 may comprise selecting a predetermined print medium prior to selecting the predetermined print mode. In this way, a predetermined print mode suitable for the selected print medium may be selected.

In some examples, a user may select a predetermined print mode, e.g. by interacting with a user interface device. In some examples, a sensor may identify a type of print medium and a predetermined print mode may be selected based on the type of print medium. A storage medium may comprise a plurality of predetermined print mode to be selected.

When the user wants to change the predetermined level of treatment fluid, the user may set a user level of treatment fluid different to this predetermined level of treatment fluid. The user may interact with a user interface device to set the user level of treatment fluid.

In some examples, obtaining 430 a plurality of color profiles for a plurality of levels of treatment fluid comprises receiving from a storage medium the plurality of color profiles. A previously generated plurality of color profiles for different levels of treatment fluid may thus be used for generating a user color profile. This plurality of color profiles may have been generated according to any of the examples herein disclosed, e.g. according to any of the examples described in connection with FIG. 2. In some examples, the plurality of color profiles may be used for generating several user color profiles. In some examples, these obtained plurality of color profiles may comprise a plurality of linearization tables, each of these tables associated with a color profile of the plurality of linearization tables.

In some examples, obtaining 430 a plurality of color profiles for a plurality of levels of treatment fluid comprises generating the plurality of color profiles. The plurality of color profiles may be generated according to any of the examples herein disclosed.

In some examples, the generated plurality of color profiles may be stored in a medium storage. These color profiles may thus be used for generating future user print mode profiles for the same print medium.

In some examples, generating the plurality of color profiles may comprise printing a plurality of test charts for a plurality of levels of treatment fluids and analyzing the plurality of test charts. The plurality of color profiles for the plurality of levels of treatment fluid may be generated based on the corresponding analyzed plurality of test charts.

The plurality of test charts may be printed according to any of examples herein disclosed, e.g. as described in connection with FIG. 3. The plurality of test charts may be printed by using a halftone technique. Each test chart of the plurality of test charts is printed using a different level of treatment fluid.

The plurality of test charts may be analyzed for generating the color profiles associated with each of the test charts. For example, a color measurement device may scan or measure the plurality of test charts. In some examples, spectral signals from each test chart may be converted to a CIELAB (LAB) or a CIEXYZ (XYZ) by a color measuring device and a profiler to a color process space to generate a color profile. For each test chart, amount of each print agent color to generate a color on the print medium may thus be obtained. A plurality of linearization tables for the plurality of levels of treatment fluid may be generated to define a combination of print agent colors for generating each color a print medium.

In some examples, a color measurement device may output a function between a color parameter and an amount of print agent color for each of the print agent colors of a test chart according to any of the examples herein disclosed. A color profile for a given level of treatment fluid may then be generated from the plurality of functions obtained by scanning a test chart printed with this given level of treatment fluid. An amount of each print agent color for reproducing each color of a plurality of colors on a print medium may be generated for this given level of treatment fluid. A profiler may transform data provided by this function to a color process space and generate the amounts of each color print agent for this given level of treatment fluid. A linearization table may be generated to define the amounts of each print agent color for each treatment fluid to create a plurality of colors on a print medium.

In some examples, obtaining 430 a plurality of color profiles for a plurality of levels of treatment fluids may comprise obtaining a plurality of linearization tables for the plurality of levels of treatment fluid, wherein each linearization table includes a combination of print agent colors for generating each color on a print medium. In some examples, the plurality of linearization tables may be obtained from a color profile stored in a medium storage. In some examples, the plurality of linearization tables may be obtained during the generation of the plurality of color profiles.

In some examples, generating 440 a user color profile may comprise generating a user linearization table by interpolating the obtained plurality of linearization tables. For example, a user linearization table may be generated from the linearization tables of FIG. 5A-5C.

In some examples, interpolating the obtained plurality of linearization may comprise one of: linear interpolation, polynomial interpolation and spline interpolation. In some examples, the user linearization table may be generated by interpolating two linearization tables for different levels of treatment fluid. In some examples, the user linearization table may be generated by interpolating three linearization tables, each of them created for different levels of treatment fluid. Accuracy of the user linearization table may thus be increased.

In some examples, interpolating the obtained plurality of linearization tables may comprise interpolating the combination of print agent colors of the plurality of linearization tables. Returning to FIG. 5A-5C, an amount of cyan for generating a color "2" for a user level of treatment fluid may be obtained by interpolating the a12 of FIG. 5A, a22 of FIG. 5B and a32 of FIG. 5C. Amount of the other print agent colors for generating the color "2" for the user level of treatment fluid may be analogously generated. In a similar way, a combination of the print agent colors may be generated for each of the colors to be reproduced on a print medium.

Figure 7:
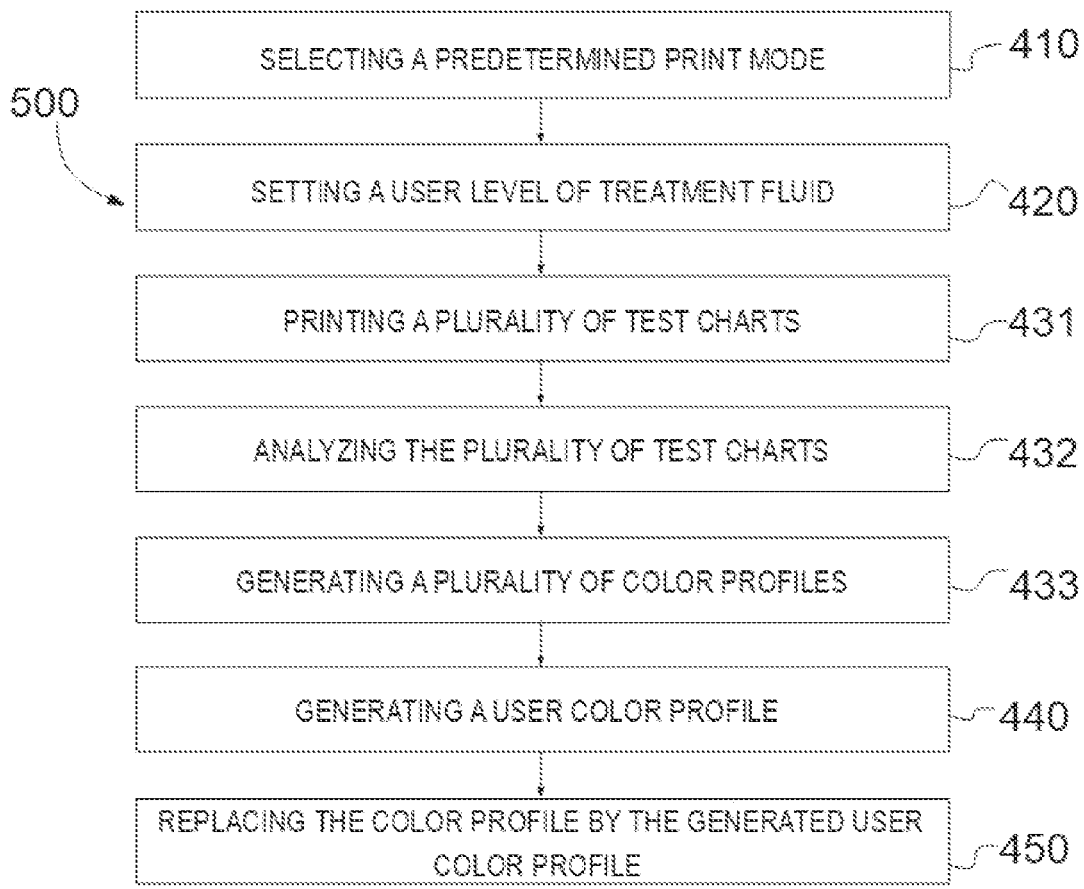
FIG. 7 is a block diagram of a method to generate a user print mode according to an example of the present disclosure.

FIG. 7 is a block diagram of a method to generate a user print mode according to an example of the present disclosure. The method 500 to generate a user print mode comprises selecting a predetermined print mode, wherein a print mode comprises a color profile for a print medium and for a level of treatment fluid as represented at block 410, setting a user level of treatment fluid different to a predetermined level of treatment fluid of the predetermined print mode as represented at block 420, printing a plurality of test charts for a plurality of levels of treatment fluids as represented at block 431, analyzing the plurality of test charts as represented at block 432, generating a plurality of color profiles for a plurality of levels of treatment fluid from the analyzed plurality of test charts as represented at block 433, generating a user color profile based on the generated plurality of color profiles as represented at block 440 and replacing the color profile of the selected predetermined print mode by the generated user color profile to generate the user print mode for the set user level of treatment fluid as represented at block 450.

The user color profile may be generated using the current conditions of the print agent, of the print medium and of the treatment fluid. Accuracy of the user print mode may thus be increased.

Blocks 410, 420, 440 and 450 may be according to any of the examples herein disclosed in connection with the method 400 depicted in FIG. 6.

In the method of FIG. 7, the plurality of color profiles are generated by printing a plurality of test charts for a plurality of levels of treatment fluids, by scanning or analyzing the plurality of test charts and generating a plurality of color profiles based on the data provided by these analysis.

The preceding description has been presented to illustrate and describe certain examples. Different sets of examples have been described; these may be applied individually or in combination, sometimes with a synergetic effect. This description is not intended to be exhaustive or to limit these principles to any precise form disclosed. Many modifications and variations are possible in light of the above teaching. It is to be understood that any feature described in relation to any one example may be used alone, or in combination with other features described, and may also be used in combination with any features of any other of the examples, or any combination of any.

The invention claimed is:

1. A method to generate a user print mode comprising:
   selecting a predetermined print mode, wherein a print mode comprises a color profile for a print medium and for a level of treatment fluid;

setting a user level of treatment fluid to a non-predetermined level of treatment fluid of the predetermined print mode;

obtaining a plurality of color profiles based upon for a plurality of levels of treatment fluid;

generating a user color profile based on the obtained plurality of color profiles; and replacing the color profile of the selected predetermined print mode by the generated user color profile to generate the user print mode for the set user level of treatment fluid.

2. The method according to claim 1, wherein obtaining a plurality of color profiles for a plurality of levels of treatment fluids comprises receiving from a storage medium the plurality of color profiles.

3. The method according to claim 1, wherein obtaining a plurality of color profiles for a plurality of levels of treatment fluids comprises generating the plurality of color profiles.

4. The method according to claim 3, wherein generating the plurality of color profiles comprises:
printing a plurality of test charts for a plurality of levels of treatment fluids; and
analyzing the plurality of test charts.

5. The method according to claim 3, wherein obtaining a plurality of color profiles for a plurality of levels of treatment fluids comprises storing in a storage medium the generated plurality of color profiles.

6. The method according to claim 1, wherein obtaining a plurality of color profiles for a plurality of levels of treatment fluids comprises obtaining a plurality of linearization tables for the plurality of levels of treatment fluid, wherein each linearization table includes a combination of print agent colors for generating each color on a print medium.

7. The method according to claim 6, wherein generating a user color profile comprises generating a user linearization table by interpolating the obtained plurality of linearization tables.

8. The method according to claim 7, wherein interpolating the obtained plurality of linearization tables comprises interpolating the combination of print agent colors of the plurality of linearization tables.

9. The method according to claim 7, wherein interpolating the obtained plurality of linearization tables comprises one of: linear interpolation, polynomial interpolation and spline interpolation.

10. A method comprising:
printing a plurality of test charts using a plurality of print agent colors, wherein each test chart comprises a different non-predetermined level of treatment fluid;
scanning the plurality of test charts;
determining for each test chart of the plurality of test charts a function between a color parameter and an amount of each print agent color of the plurality of print agent colors; and
generating, based on each determined function, a color profile for each level of treatment fluids so that a plurality of color profiles for different non-predetermined levels of treatment fluid is generated.

11. The method according to claim 10 comprising storing the generated color profiles in a medium storage.

12. The method according to claim 10, wherein generating a color profile a level of treatment fluids comprises determining an amount of each print agent color of the plurality of print agent colors to generate a plurality of colors on a print medium.

13. The method according to claim 12, wherein determining an amount of each print agent color of the plurality of print agent colors comprises generating a linearization table comprising the amount of each print agent color of the plurality of print agent colors to generate the plurality of colors on a print medium.

14. The method according to claim 10, wherein the color parameter comprises lightness.

15. A printing system comprising:
print agent printheads to deliver different print agent colors onto a print medium;
a treatment fluid printhead to deliver treatment fluid;
a controller to:
receive a selection of a predetermined print mode having a predetermined color profile for a predetermined level of treatment fluid;
receive a user selection of replacing the predetermined level of treatment fluid by a user level of treatment fluid, wherein the user level of treatment fluid is a non-predetermined level of treatment fluid;
generate a user color profile for the user level of treatment fluid by estimating an amount of different print agent colors to generate a plurality of colors from a plurality of color profiles for several levels of treatment fluid;
generate a user print mode based on the generated user color profile for the user level of treatment fluid; and
set the user print mode.

\* \* \* \* \*